(12) United States Patent
Salzinger

(10) Patent No.: US 11,482,879 B2
(45) Date of Patent: Oct. 25, 2022

(54) SOLAR-POWERED CHARGING DEVICES

(71) Applicant: MPOWERD Inc., Brooklyn, NY (US)

(72) Inventor: John Salzinger, Brooklyn, NY (US)

(73) Assignee: MPOWERD INC., Brooklyn, NY (US)

( * ) Notice: Subject to any disclaimer, the term of this patent is extended or adjusted under 35 U.S.C. 154(b) by 405 days.

(21) Appl. No.: 16/600,161

(22) Filed: Oct. 11, 2019

(65) Prior Publication Data

US 2020/0119582 A1    Apr. 16, 2020

Related U.S. Application Data

(60) Provisional application No. 62/744,401, filed on Oct. 11, 2018.

(51) Int. Cl.
*H02J 7/35* (2006.01)
*H02J 7/02* (2016.01)
*H02J 7/00* (2006.01)

(52) U.S. Cl.
CPC .............. *H02J 7/35* (2013.01); *H02J 7/0027* (2013.01); *H02J 7/025* (2013.01)

(58) Field of Classification Search
CPC ........................................................ H02J 7/35
See application file for complete search history.

(56) References Cited

U.S. PATENT DOCUMENTS

| 2016/0322850 | A1* | 11/2016 | Yeh | H04B 5/0037 |
| 2017/0294803 | A1* | 10/2017 | Langlois | H02S 20/30 |
| 2018/0226832 | A1* | 8/2018 | Singh | H02J 7/35 |

* cited by examiner

*Primary Examiner* — Robert Grant
(74) *Attorney, Agent, or Firm* — Bookoff McAndrews, PLLC

(57) ABSTRACT

Induction charging devices equipped with solar panels are described. The charging device may comprise a housing containing at least one induction coil, a circuit board, and at least one solar panel operably coupled to the induction coil and the circuit board. The induction coil may be proximate a first surface of the housing to thereby define an induction area of the first surface. The solar panel may be coupled to or integrated into a second surface the housing such that the solar panel faces outward from the housing, e.g., for exposure to the sun or a source of artificial light. The first surface and the second surface may face in the same direction or opposite directions.

20 Claims, 3 Drawing Sheets

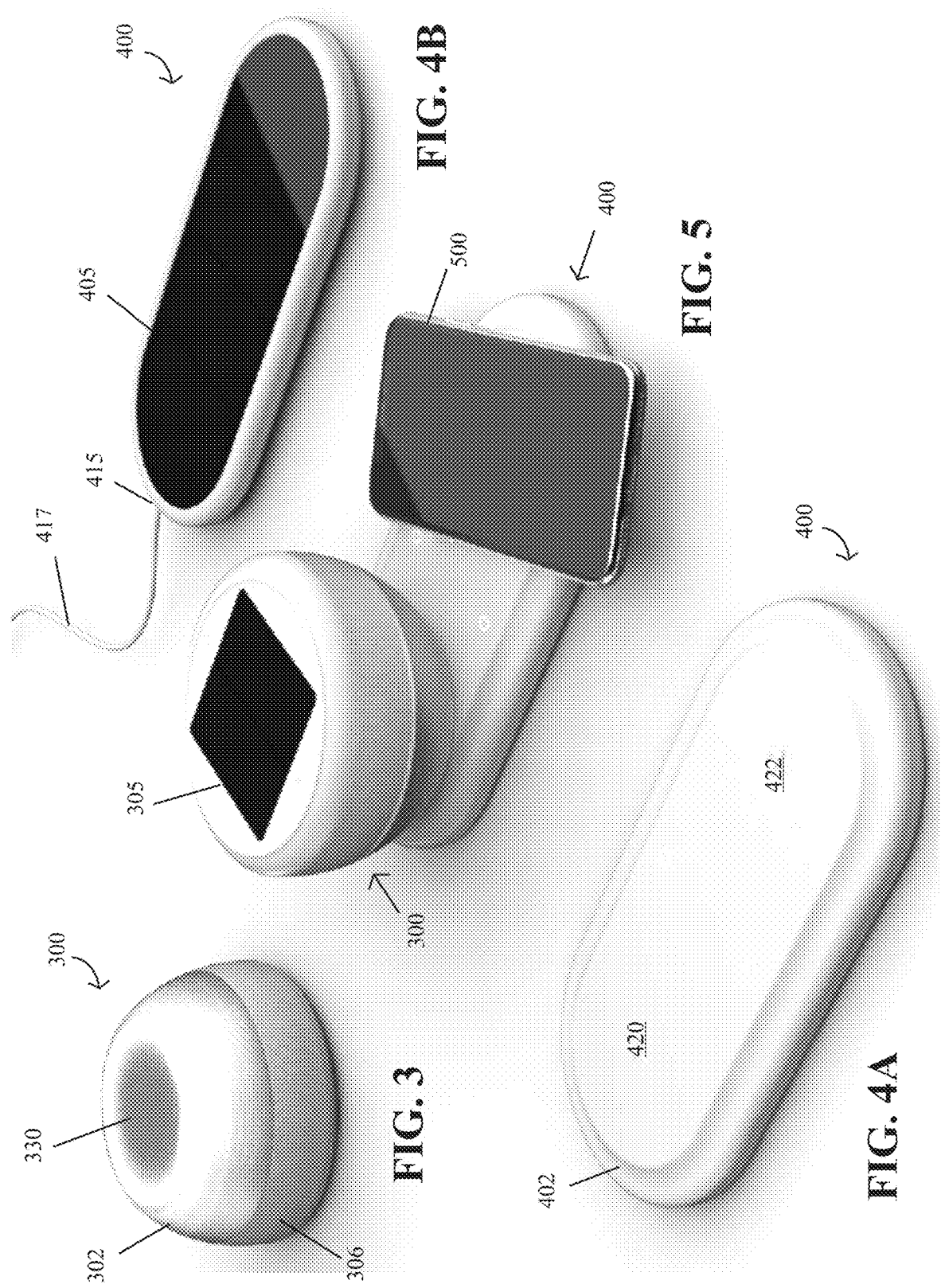

SOLAR-POWERED CHARGING DEVICES

CROSS-REFERENCE TO RELATED APPLICATIONS

This application claims priority to U.S. Provisional Application No. 62/744,401 filed on Oct. 11, 2018, which is incorporated by reference herein in its entirety.

TECHNICAL FIELD

The present disclosure generally relates to charging devices. More particularly, the present disclosure includes solar-powered induction charging devices.

BACKGROUND

The ubiquity of consumer electronics has increased the need for adequate charging (recharging) solutions. Consistent use of electronic devices such as mobile phones, tablets, and smart watches has led to the need for recharging power on a daily basis. Chargers often include a cable that must be plugged into a power source for recharging of an electronic device, which prevents the charger from being used in locations of limited or no power access, when an outlet is not available. Other types of chargers such as power banks can themselves be charged beforehand via an outlet and transported to another location for use, but only until the battery is depleted. At that point, the power bank again must be plugged in and recharged before it can be used. These types of charging systems are inadequate in more remote locations and situations where an outlet is not nearby.

SUMMARY

The present disclosure includes induction chargers that may be used to charge a variety of electronic devices. The induction chargers may include one or more solar panels, and optionally one or more batteries in communication with the solar panel(s).

For example, the present disclosure includes a charging device comprising a housing containing at least one induction coil and a circuit board operably coupled to the induction coil; and at least one solar panel operably coupled to the induction coil and the circuit board; wherein the induction coil is proximate a first surface of the housing to thereby define an induction area of the first surface; wherein the solar panel is coupled to or integrated into a second surface of the housing such that the solar panel faces outward from the housing; and wherein the first surface and the second surface face in opposite directions. According to some aspects of the present disclosure, the charging device further comprises a rechargeable battery operably coupled to the induction coil, the circuit board, and the solar panel. In at least one example, the charging device does not include a battery. The charging device may include at least two induction coils adjacent to each other, such that the first surface includes at least two induction areas. The housing may have a frustoconical shape, for example, or a rectangular shape, among other possible shapes. Optionally, the housing may comprise a polymer such as acrylonitrile butadiene styrene, polypropylene, polyethylene, thermoplastic polyurethane, polyvinylchloride, or a combination thereof. The charging device may further comprise an electronic connector, such as a USB connector. The at least one solar panel may include an array of photovoltaic panels.

The present disclosure also includes a charging device comprising a housing containing at least two induction coils adjacent to each other and a circuit board operably coupled to the induction coils; and at least one solar panel operably coupled to the induction coils and the circuit board; wherein each induction coil is proximate a first surface of the housing to thereby define two induction areas of the first surface; wherein the solar panel is coupled to or integrated into a second surface of the housing such that the solar panel faces outward from the housing; and wherein the first surface is parallel to the second surface. The first surface may comprise a polymer, the first surface being a non-slip surface. The first surface and the second surface may face in opposite directions or the same direction. In at least one example, the second surface is movable relative to a remainder of the housing, the housing having a first configuration wherein the second surface is parallel to the first surface, and a second configuration wherein the second surface is transverse to the first surface. For example, the first surface and the second surface may face in a same direction when the housing is in the first configuration. The charging device may further comprise a USB connector, a rechargeable battery, or both.

The present disclosure also includes a charging device comprising a housing containing at least one induction coil and a circuit board operably coupled to the induction coil; and at least one solar panel operably coupled to the induction coil and the circuit board; wherein the induction coil is proximate a first surface of the housing to thereby define an induction area of the second surface; wherein the solar panel is coupled to or integrated into a second surface of the housing such that the solar panel faces outward from the housing; and wherein the housing has a first configuration wherein the second surface is parallel to the first surface, and a second configuration wherein the second surface is transverse to the first surface. The second surface may be movable, e.g., rotatable, relative to the first surface and/or relative to a remainder of the housing. For example, the housing may include a compartment when the housing is in the first configuration, wherein moving the housing from the first configuration to the second configuration opens the compartment to access the induction area of the first surface. The charging device may further comprise a USB connector, a rechargeable battery, or both. The second surface may comprise a polymer, the second surface being a non-slip surface. For example, the housing may comprise acrylonitrile butadiene styrene, polypropylene, polyethylene, thermoplastic polyurethane, polyvinylchloride, or a combination thereof. In at least one example, the charging device does not include a battery.

BRIEF DESCRIPTION OF THE DRAWINGS

The accompanying drawings, which are incorporated in and constitute a part of this specification, illustrate various exemplary embodiments and together with the description, serve to explain the principles of the present disclosure.

FIG. 3 shows an exemplary electronic device, according to some aspects of the present disclosure.

FIGS. 4A-4B show an exemplary charging device, according to some aspects of the present disclosure.

FIG. 5 illustrates the charging device of FIGS. 4A-4B and two electronic devices.

DETAILED DESCRIPTION

Figure 1A:
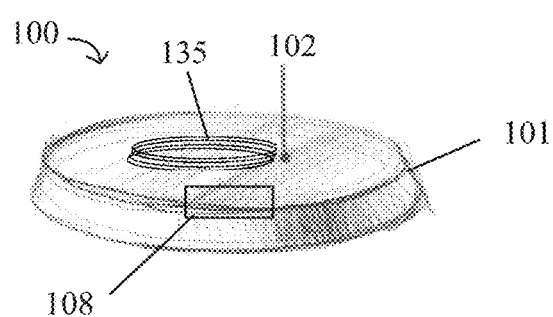
FIGS. 1A-1B show an exemplary charging device, according to some aspects of the present disclosure.

The terminology used in this disclosure may be interpreted in its broadest reasonable manner, even though it is being used in conjunction with a detailed description of certain specific examples of the present disclosure. Both the foregoing general description and the following detailed description are exemplary and explanatory only and are not restrictive of the features, as claimed.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. The terms "comprises," "comprising," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. The term "exemplary" is used in the sense of "example" rather than "ideal."

The present disclosure includes portable, wireless charging devices. For example, the charging devices herein may operate by induction charging to recharge a multitude of different electronic devices without the need for a power outlet. In some aspects of the present disclosure, the charging devices may be modular, e.g., including one or more components that are replaceable and/or removable from the charging device, and/or may include one or more components movable relative to other components. The charging devices herein may be rechargeable by solar power. For example, the charging devices herein may have different configurations to facilitate contact between an induction platform of the charging device and/or exposure of a solar panel of the charging device to the sun or artificial light for recharging.

According to some examples, the charging device (e.g., induction charger) includes one or more solar panels disposed on a first surface of the charging device, with a second surface of the charging device forming the induction surface. In some examples, the first and second surfaces may be opposite each other, e.g., facing in opposite directions. Thus, a top surface of the charging device may include the solar panel(s), while a bottom surface forms the induction surface, or vice versa. In some examples, the first and second surfaces may at least partially overlay each other, wherein moving the first surface (e.g., including the solar panel(s)) exposes the second surface (e.g., induction platform or surface).

The housing of the charging devices herein may contain one or more batteries, e.g., rechargeable batteries, operably coupled to the solar panel(s). Thus, for example, the solar panel(s) may generate current that is then stored in the rechargeable battery(ies). Additionally or alternatively, the charging device may include one or more electronic connectors, e.g., USB and/or micro-USB ports, among other types of electronic connectors, to allow for charging the charging device via an external power source. In some examples, the charging device may include a battery level indicator (e.g., comprising LED indicator lights or other user interface) to display to a user the amount of power remaining in the battery.

Figure 1B:
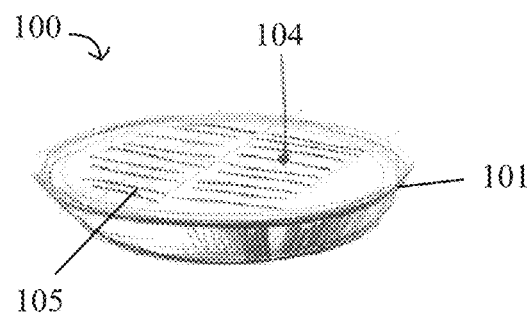

FIGS. 1A and 1B illustrate an exemplary charging device 100 that may be use to wirelessly recharge an electronic device (see, e.g., FIGS. 3 and 5). For example, the charging device may be use to charge any electronic device with a rechargeable battery, including, but not limited to, a portable light, speaker, sensor, clock or other device with a digital display, or tracking device (e.g., a device with wireless tracking capability such as GPS, Bluetooth, etc.), among other types of electronic devices.

The charging device 100 comprises a housing 101 that includes first surface 102 for induction charging (e.g., being an induction surface or including an induction area) and a second surface 104 that includes one or more solar panels 105. The charging device 100 may include one solar panel 105 or an array of solar panels 105 (e.g., an array of photovoltaic panels), such as, e.g., 2, 3, or 4 or more solar panels operably coupled together. As shown, for example, the charging device 100 may include a two solar panels 105 arranged in an array. The solar panel(s) 105 may comprise monocrystalline and/or polycrystalline silicon. In some examples, the solar panel(s) 105 may be flexible. The surface of the solar panel(s) 105 may be covered by a transparent film to protect the surface while allowing sunlight to pass through for generating current. Exemplary voltages of the solar panel(s) 105 may generally range from about 4V to about 8V, e.g., about 5V, about 6V, or about 7V, but other voltages may be encompassed by the disclosure herein.

The charging device 100 also includes a charging unit 108 within the housing 101 (see FIG. 1A; not shown in FIG. 1B for simplicity), the charging unit 108 including one or more electronic components such as a circuits (e.g., a circuit board), a microprocessor, a current regulator, and/or a rechargeable battery. The charging unit 108 may be operably coupled to the solar panel(s) 105. For example, the solar panel(s) 105 may transfer power to a battery and/or other electronic components of the charging unit 108. The charging device 100 also includes at least one induction coil 135 contained within the housing 101 proximate the first surface 102 and operably coupled to the charging unit 108. The induction coil 135 may comprise any suitable material for electromagnetic induction, such as copper.

According to some aspects of the present disclosure, the charging device 100 does not include a battery. For example, the charging device 100 may be placed on top of the induction surface of an electronic device to be charged, such that the solar panel(s) 105 face towards the sun or a source of artificial light to generate power. At the same time, the first surface 102 may contact the induction surface of the electronic device, such that the induction coil 135 is aligned with a corresponding induction coil of the electronic device for charging. Omitting a battery may have certain benefits, such as making the charging device 100 more lightweight and economical.

As shown in FIGS. 1A-1B, the housing 101 of the charging device 100 may be generally frustoconical in shape, having rounded edges and a curved side wall between the first and second surfaces 102, 104. The housing 101 may have any other suitable shape, including, but not limited to, square, rectangular, cylindrical, pyramidal, and other polygonal shapes, optionally with rounded edges. The first and second surfaces 102, 104 may be parallel to each other and planar, in some examples. The first and second surfaces 102, 104 need not be flat and may instead be curved, uneven, or include raised or lowered areas. Further, the first and second surfaces 102, 104 may have any desired cross-sectional shape such as circular, triangular, rectangular, or other polygonal, etc. All or part of the housing 101 may comprise a polymer, e.g., so as not to interfere with charging.

The solar panel(s) 105 may be integral or otherwise permanently incorporated into the charging device 100 (e.g., incorporated into the housing 101), or the solar panel(s) 105 may be removable. For example, the solar panel(s) 105 may be coupled to a wall of the housing 101 or may form a wall or a portion of a wall of the housing 101. In at least one example, the solar panel(s) 105 may be coupled to a battery and/or other electronics of the charging unit 108 housed within the charging device 100 via complementary mating features, such as magnets. Thus, for example, the solar panel(s) 105 may be magnetically coupled to a battery within the housing 101 via one or more magnets of the solar panel 105 complementary to one or more magnets of the battery. Such configurations may allow the solar panel(s) 105 to be selectively coupled and uncoupled (e.g., attached and detached) from the battery. According to some aspects of the present disclosure, the battery may generate a voltage from about 2V to about 5V, such as from about 3V to about 4V, e.g., a voltage of about 3.2V, about 3.5V, or about 3.7V. The battery may have a capacity up to at least 2000 mAh, such as a capacity of about 500 mAh, about 750 mAh, about 1000 mAh, about 1250 mAh, about 1500 mAh, about 1750 mAh, or about 2000 mAh.

In some examples, the first surface 102 configured for induction charging may be disposed opposite the solar panel(s) 105, as shown in FIGS. 1A-1B (e.g., with one or more side walls of the housing 101 between the first surface 102 and the second surface 104). Thus, for example, the orientation of the induction coil(s) 135 within the housing 101 may provide for induction charging via contact with the first surface 102. Other configurations and arrangements of the induction surface(s), induction coil(s), and solar panel(s) are possible and encompassed herein.

The induction surface (or surfaces) of the charging devices herein may provide for charging one electronic device or a plurality of electronic devices simultaneously. For example, the charging devices herein may include 1, 2, or 3 or more induction coils, each coil configured to create an alternating electromagnetic field that may induce a current in the device to be charged. According to some aspects of the present disclosure, the charging device may include two or more induction coils, optionally arranged adjacent to each other, such that the induction surface includes two or more corresponding induction areas available for charging multiple devices simultaneously. The induction coil(s) may comprise a suitable metal such as copper, with the dimensions and number of turns of each coil chosen to provide the desired power transmission. Further, the charging devices herein may be capable of charging electronic devices multiple times. The charging devices herein may be compatible with the Qi standard for wireless charging. The charging devices herein may comprise any suitable material or materials, including one or more polymers such as, e.g., acrylonitrile butadiene styrene (ABS), polypropylene, polyethylene, silicone, polyurethane, including thermoplastic polyurethane (TPU), polyvinylchloride (PVC), or a combination thereof. The material(s) forming the induction surface or surfaces may be non-slip or include surface features to promote friction between an electronic device and the induction surface(s) to facilitate charging.

Figure 2A:
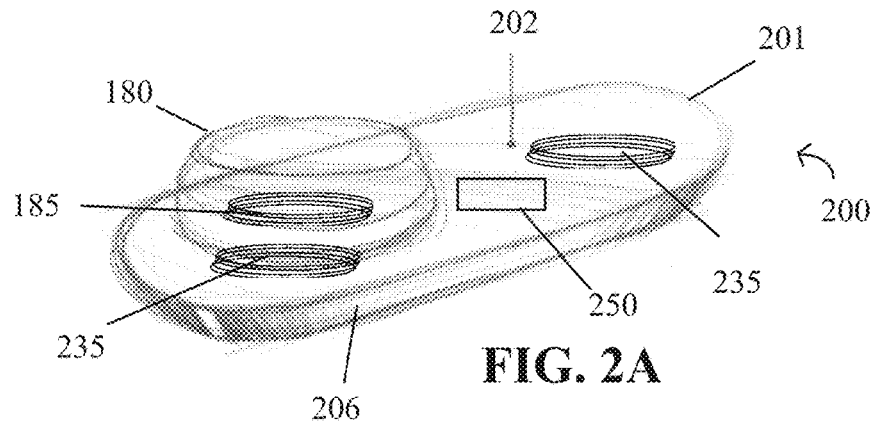
FIGS. 2A-2B show another exemplary charging device, according to some aspects of the present disclosure.
Figure 2B:
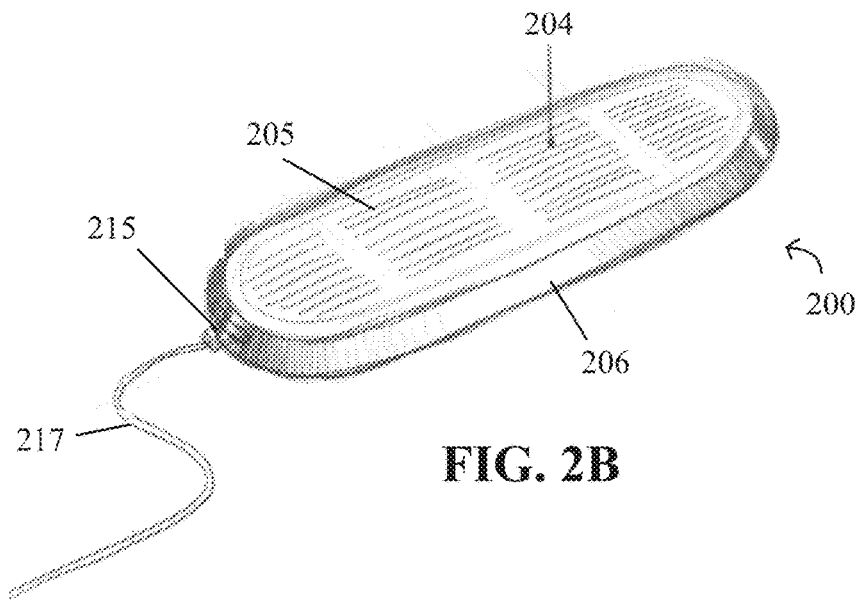

FIGS. 2A and 2B show an exemplary charging device 200 that includes more than one induction coil. Charging device 200 may include any of the features of charging device 100. As shown, the charging device 200 comprises a housing 201 that includes a first surface 202 for induction charging (e.g., an induction surface) and a second surface 204 that includes one or more solar panels 205. The charging device 200 may include one solar panel 205 or an array of solar panels 205 (e.g., an array of photovoltaic panels), such as, e.g., 2, 3, or 4 or more solar panels operably coupled together. As shown, for example, the charging device 200 may include a plurality of solar panels 205 arranged in an array.

The first surface 202 configured for induction charging may be disposed opposite the solar panels 205, as shown in FIGS. 2A-2B. For example, one or both of the first surface 202 and the second surface 204 may be flat and optionally parallel to each other. In this example, the housing 201 is elongated and generally frustoconical in shape, having rounded edges and a curved side wall 206 between the first and second surfaces 202, 204. The housing 201 may have any other suitable shape, including, but not limited to, square, rectangular, cylindrical, pyramidal, and other polygonal shapes, optionally with rounded edges. The first and second surfaces 202, 204 need not be flat and may instead be curved, uneven, or include raised or lowered areas. Further, the first and second surfaces 204 may have any desired cross-sectional shape such as circular, triangular, rectangular, or other polygonal, etc.

As mentioned above, the housing 201 of the charging device 200 contains two induction coils 235, each induction coil 235 providing a localized area of electromagnetic induction on the first surface 202 in order to charge two electronic devices simultaneously (see also FIGS. 4A and 5). The housing 201 also contains a charging unit 250 (see FIG. 2A; not shown in FIG. 2B for simplicity) operably coupled to the solar panel(s) 205 and the induction coils 235, wherein the charging unit 250 may include circuits (e.g., a circuit board), a microprocessor, and/or current regulator, and optionally a rechargeable battery. According to some aspects of the present disclosure, the charging device 200 does not include a battery. For example, the charging device may include one or more solar panels 205 configured to wirelessly charge electronic devices directly via the induction surface(s), e.g., without storing energy generated by the solar panel in a battery.

FIG. 2A also shows an exemplary electronic device 180 that includes an induction coil 185 aligned with one of the induction coils 235 of the charging device 200. Electronic device 180 may include any of the features of the electronic devices disclosed in U.S. application Ser. No. 16/754,912, filed on Sep. 18, 2019, which is incorporated by reference herein in its entirety. Alignment of the respective induction coils 185, 235 provides for wireless energy transfer from the changing device 200 to the electronic device 180 (e.g., to a rechargeable battery of electronic device 180) via electromagnetic induction.

The charging device 200 may include an electronic connector 215, such as, e.g., a USB or USB-type connector (USB-A, USB-B, micro-USB, etc.), and other types of electronic connectors such as Lightning. The electronic connector 215 may be a male or female connection. The electronic connector 215 may allow for connection to a power supply via a cable 217, e.g., to transfer and/or receive power by the charging device 200. For example, if the charging device 200 includes a rechargeable battery, the electronic connector 215 may be used to transfer power from the battery to an electronic device and/or to recharge the battery via an external power supply. While not shown in FIGS. 1A-1B, charging device 100 also may include an electronic connector.

An exemplary electronic device 300 is shown in FIG. 3, in the form of a portable lighting device that may include one or more light sources, such as light-emitting diodes, and a speaker. For example, the electronic device 300 may include any of the features of electronic devices disclosed in U.S. application Ser. No. 16/754,912, filed on Sep. 18, 2019, which is incorporated by reference herein in its entirety. Electronic device 300 includes a cover 302, at least a portion of which may be translucent or transparent to allow light generated from LEDs within the device 300 to pass therethrough. The uppermost portion of the cover 302 may be flat (planar) and provide an induction surface 330. That is, the uppermost portion of the cover 302 may correspond to a portion of the housing that overlays an induction coil, similar to induction coil 185 of electronic device 180. Contacting the induction surface 330 with a corresponding induction surface of a charging device (e.g., induction area 420 of charging device 400; see FIGS. 4A and 5) may allow for wireless charging of a rechargeable battery contained within the electronic device 300. As further illustrated in FIG. 5, the electronic device 300 also includes at least one solar panel 305, e.g., coupled to or integrated into a surface of the housing opposite the cover 302. In such cases, a user may have the option of recharging the electronic device 300 via a charging device, via the solar panel(s) 305, or both.

FIGS. 4A-4B illustrate a charging device 400 similar to charging device 200 of FIGS. 2A-2B, and which may include any of the features of charging device 200 and/or charging device 100. For example, the charging device 400 includes a first surface 402 with two induction areas 420, 422, corresponding to portions of the housing that overlay respective induction coils (similar to induction coils 235 of charging device 200). On the bottom or flip side of the charging device 400 is a second surface that includes one or more solar panels 405. As mentioned above, the solar panel(s) 405 may include a cover for protection, such as a transparent film. Charging device 400 also includes an electronic connector 415 (e.g., USB or USB-type connector) and a cable 417 for connecting the charging device 400 to a source of power, e.g., via an outlet. FIG. 5 shows the charging device 400 being used to recharge two electronic devices simultaneously via respective induction areas 420, 422, i.e., the electronic device 300 of FIG. 3, and a second electronic device 500, such as a smart phone.

Figure 6A:
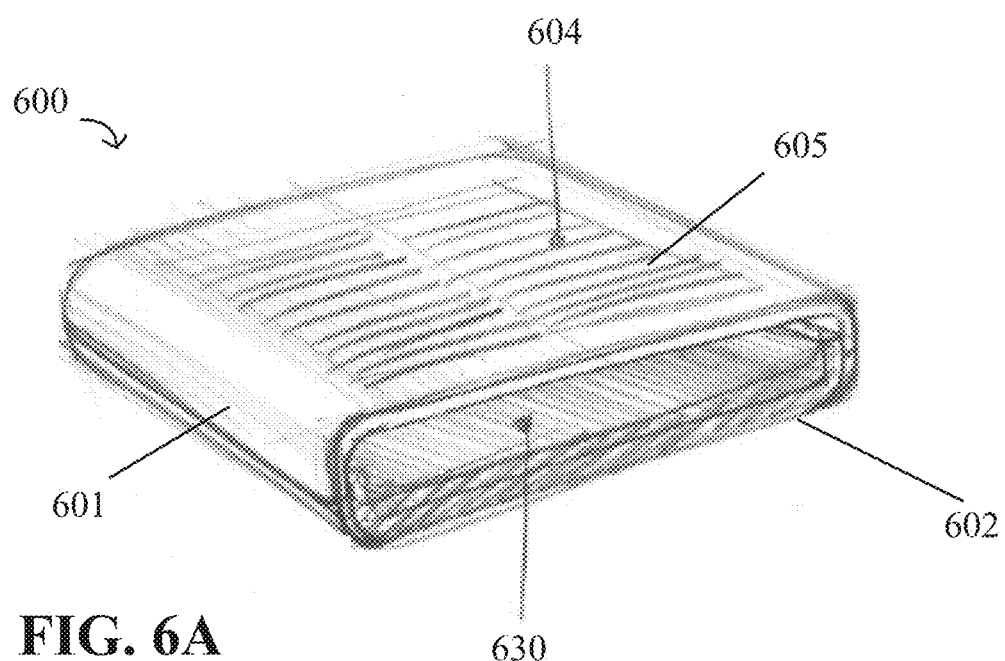
FIGS. 6A-6B show another exemplary charging device, according to some aspects of the present disclosure.
Figure 6B:
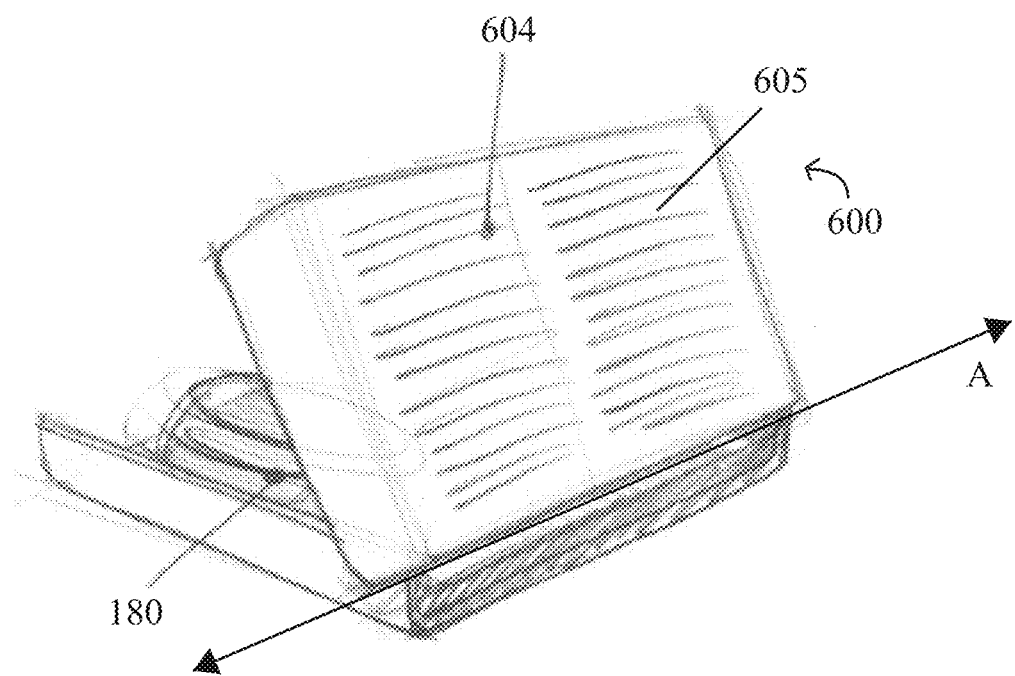

According to some aspects of the present disclosure, the charging device includes one or more components that are modular or movable. Thus, for example, the charging device may be manipulated into different configurations, e.g., to facilitate charging of the solar panel(s) and/or for access to induction areas for recharging electronic devices. FIGS. 6A-6B illustrate another exemplary charging device 600, which may include any of the features of charging devices 100, 200, and/or 400. The charging device 600 comprises a housing 601 that includes a first wall 602 coupled to a second wall 604, the second wall 604 including one or more solar panels 605 coupled thereto or otherwise integrated into the second wall 604 (e.g., coupled to or otherwise integrated into a surface defined by the second wall 604).

As shown, the second wall 604 pivots about an axis A in order to angle the solar panel(s) 605 toward the sun. Pivoting the second wall 604 reveals a compartment that includes an induction platform (induction surface 630) upon which an electronic device may be provided for charging. For example, FIG. 6B shows electronic device 180 (see FIG. 2A) positioned on the induction surface 630 to be charged. In this example, the induction surface 630 is provided by an inward facing wall of the housing 601 rather than an outward facing wall or surface, as is the case for charging devices 100, 200, and 400. In this way, the induction surface 630 may be accessed by moving (e.g., rotating) the second wall 604 relative to the remainder of the housing 601. Thus, the housing 601 has a first configuration, e.g., wherein the second wall 604 is parallel to the first wall 602 and parallel to the induction surface 630, and a second configuration wherein the second wall 604 is transverse to the first wall 602 and transverse to the induction surface 630. The induction surface 630 may include only one induction area (e.g., the charging device 600 having one induction coil, similar to charging device 100) or two or more induction areas (e.g., the charging device 600 having two or more induction coils, similar to charging devices 200 and 400).

The charging device 600 may include a battery, or, according to some aspects of the present disclosure, the charging device 600 does not include a battery. For example, the charging device 600 may be manipulated such that the solar panel(s) 605 are tilted towards the sun while the induction surface 630 remains flat (see FIG. 6B). This configuration allows for placement of an electronic device on top of the induction surface 630 while the solar panel(s) 605 generate power by exposure to sunlight.

The charging devices herein may operate as a portable powerbank, e.g., useful for recharging electronic devices in locations without a consistent or reliable source of power. Further, for example, the charging devices herein may be lightweight and weatherproof (e.g., water resistant or water proof), useful for charging under various conditions, including outdoor use and during travel, as well as indoor (e.g., in home) use. The charging devices herein may be used to charge various consumer electronic devices such as mobile phones (e.g., smartphones), tablet devices, headphones, music players (e.g., MP3 player, MP4 player, etc.), speakers, smart watches, lights (including solar-powered lighting devices), digital cameras, and other wireless-charging capable devices.

It is intended that the specification and examples be considered as exemplary only, with a true scope and spirit of the present disclosure being indicated by the following claims.

What is claimed is:

1. A charging device, comprising:
    a housing containing at least one induction coil and a circuit board operably coupled to the induction coil; and
    at least one solar panel operably coupled to the induction coil and the circuit board;
    wherein the induction coil is proximate a first exterior surface of the housing to thereby define an induction area outside of the housing proximate to the first exterior surface;
    wherein the solar panel is coupled to or integrated into a second exterior surface of the housing such that the solar panel faces outward from the housing; and
    wherein the first exterior surface and the second exterior surface face in opposite directions, the charging device being configured to charge an electronic device positioned outside the housing and proximate to the induction area at the first exterior surface.

2. The charging device of claim 1, wherein the charging device further comprises a rechargeable battery operably coupled to the induction coil, the circuit board, and the solar panel.

3. The charging device of claim 1, wherein the charging device includes at least two induction coils adjacent to each other, such that the first exterior surface includes at least two induction areas.

4. The charging device of claim 1, wherein the housing has a frustoconical shape or a rectangular shape, and wherein the first exterior surface and the second exterior surface are fixed and immovable relative to each other.

5. The charging device of claim 1, wherein the housing is rigid and comprises acrylonitrile butadiene styrene, polypropylene, polyethylene, thermoplastic polyurethane, polyvinylchloride, or a combination thereof.

6. The charging device of claim 1, wherein the charging device further comprises a USB connector.

7. The charging device of claim 1, wherein the at least one solar panel includes an array of photovoltaic panels.

8. A charging device, comprising:
a housing containing at least two induction coils adjacent to each other and a circuit board operably coupled to the induction coils; and
at least one solar panel operably coupled to the induction coils and the circuit board;
wherein each induction coil is proximate a first exterior surface of the housing to thereby define two induction areas outside of the housing proximate to the first exterior surface;
wherein the solar panel is coupled to or integrated into a second exterior surface of the housing such that the solar panel faces outward from the housing; and
wherein the first exterior surface and the second exterior surface define rigid planar walls of the housing, and the charging device is configured to charge at least one electronic device positioned outside the housing and proximate to one or both of the two induction areas at the first exterior surface.

9. The charging device of claim 8, wherein the first exterior surface comprises a polymer, the first exterior surface being a non-slip surface.

10. The charging device of claim 8, wherein the first exterior surface and the second exterior surface face in opposite directions.

11. The charging device of claim 8, wherein the charging device further comprises a USB connector, a rechargeable battery, or both.

12. A charging device, comprising:
a housing containing at least one induction coil and a circuit board operably coupled to the induction coil; and
a solar panel operably coupled to the induction coil and the circuit board, the solar panel including an array of photovoltaic panels;
wherein the induction coil is proximate a first exterior surface of the housing to thereby define an induction area outside of the housing and proximate to the first exterior surface;
wherein the solar panel is coupled to or integrated into a second exterior surface of the housing such that the solar panel faces outward from the housing, the charging device being configured to charge an electronic device positioned outside the housing and proximate to the induction area at the first exterior surface; and
wherein the second exterior surface is parallel to the first exterior surface, and the array of photovoltaic panels extends along an entirety of the second exterior surface.

13. The charging device of claim 12, wherein the charging device further comprises a USB connector, a rechargeable battery, or both.

14. The charging device of claim 12, wherein the first exterior surface comprises a polymer, the first exterior surface being a non-slip surface.

15. The charging device of claim 12, wherein the charging device does not include a battery.

16. The charging device of claim 1, wherein the housing includes rounded edges and a curved side wall between the first exterior surface and the second exterior surface.

17. The charging device of claim 7, wherein the array of photovoltaic panels extends along an entirety of the second exterior surface.

18. The charging device of claim 8, wherein the first exterior surface includes one or more surface features to promote friction between the at least one electronic device and the first exterior surface.

19. The charging device of claim 8, wherein the charging device is configured to charge two electronic devices simultaneously.

20. The charging device of claim 12, wherein the solar panel is coupled to the second exterior surface via complementary mating elements, the solar panel being removable from the second exterior surface.

* * * * *